Dec. 23, 1958  J. H. McLAREN  2,865,233
SAW SHARPENING DEVICE
Filed April 21, 1958  3 Sheets-Sheet 1

INVENTOR.
John H. McLaren
BY
Parker Brochman
Attorneys.

Dec. 23, 1958   J. H. McLAREN   2,865,233
SAW SHARPENING DEVICE
Filed April 21, 1958   3 Sheets-Sheet 2
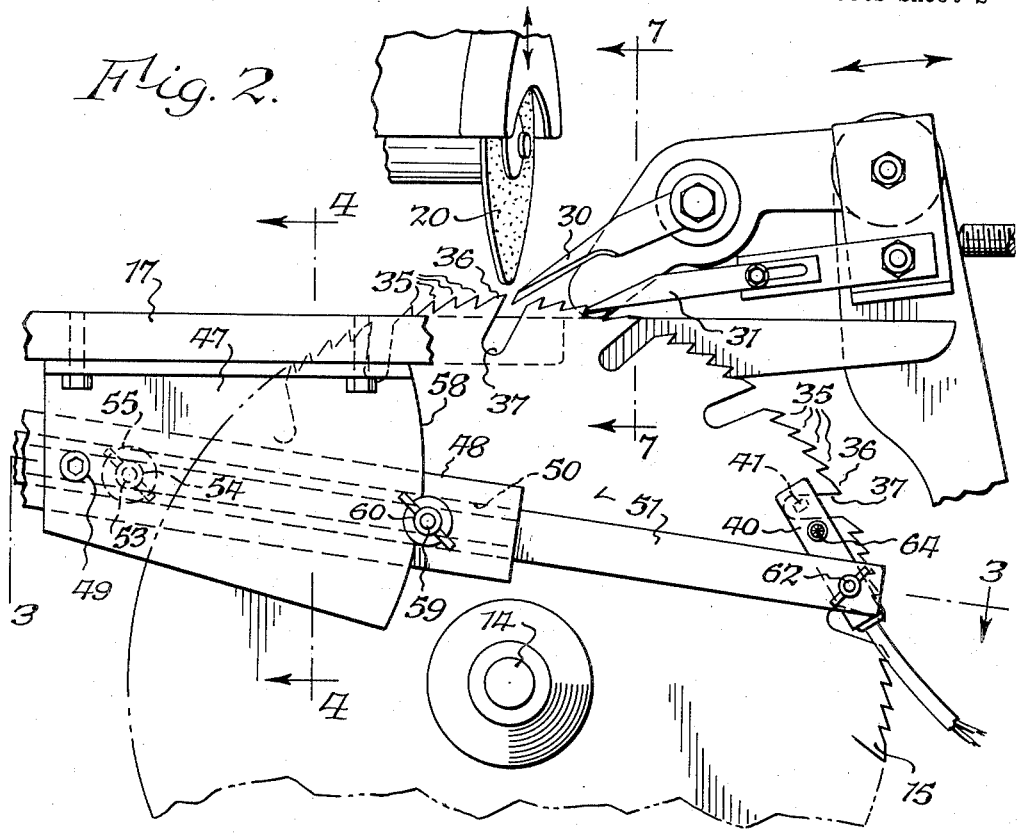
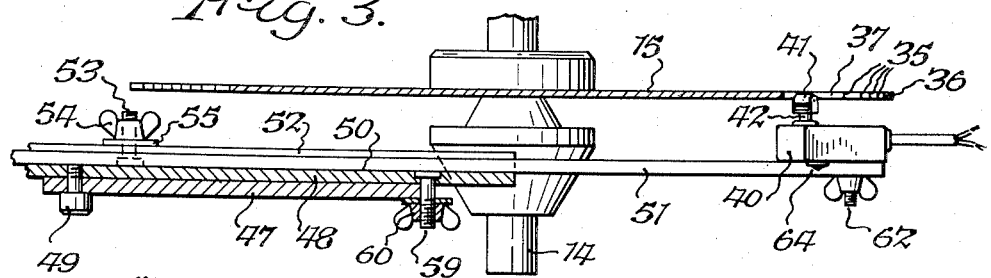
INVENTOR.
John H. McLaren
BY
Parker Brahmson
Attorneys.

Dec. 23, 1958 J. H. McLAREN 2,865,233
SAW SHARPENING DEVICE
Filed April 21, 1958 3 Sheets-Sheet 3

INVENTOR.
John H. McLaren
BY
Parker & Perchnor,
Attorneys.

United States Patent Office 2,865,233
Patented Dec. 23, 1958

2,865,233

SAW SHARPENING DEVICE

John H. McLaren, Buffalo, N. Y.

Application April 21, 1958, Serial No. 729,998

7 Claims. (Cl. 76—41)

This invention relates to improvements in apparatus for sharpening saw blades and particularly to sharpening blades of the type which have relatively deep kerfs interposed between groups of teeth.

Automatic machines for sharpening saw blades with teeth equally spaced are well known. Such machines have also been used for operating on saw blades in which the teeth are arranged in an irregular manner, for example in groups separated from each other by deep kerfs, but when using a standard saw-sharpening machine in this manner it has been necessary to provide the machine with a template corresponding to the shape of the irregular saw blade and by means of which the movement of the sharpening device was controlled. This, however, required a different template for each size and type of saw blade which made the cost of sharpening irregular saw blades in this manner too expensive for ordinary use and practical only when a large number of saw blades of identical size and shape were to be operated on.

One of the objects of this invention is to provide mechanism actuated by the saw which is being sharpened to stop movement of the sharpening member toward the saw when a deep kerf of the saw is in position to be actuated by the sharpening means.

A further object is to provide an attachment which may be applied to saw-sharpening machines of the kind now in common use, so that such machines can be adapted for operating on the combination or irregular type of saw blade, without requiring any templates.

Another object is to provide mechanism of this type in which the saw blade which is being sharpened acts as a template for controlling the movement of the grinding wheel or other sharpening device.

A further object is to provide an attachment of this kind which has a switch or circuit-opening and closing device mounted on the machine in correct relation to the saw blade being sharpened and cooperating with a control mechanism which renders the sharpening mechanism inoperative when in operative relation to the deep kerf; also to provide an attachement of this type including a part actuated electrically for limiting the movement of the sharpening member toward the saw blade when the switch member is actuated by a deep kerf.

In the accompanying drawings:

Fig. 2 is a fragmentary front elevation on an enlarged scale of a portion of sharpening machine and showing my attachment applied thereto.

Fig. 3 is a fragmentary, sectional plan view thereof on line 3—3, Fig. 2.

Fig. 4 is a fragmentary sectional elevation thereof on line 4—4, Fig. 2.

Figure 1:
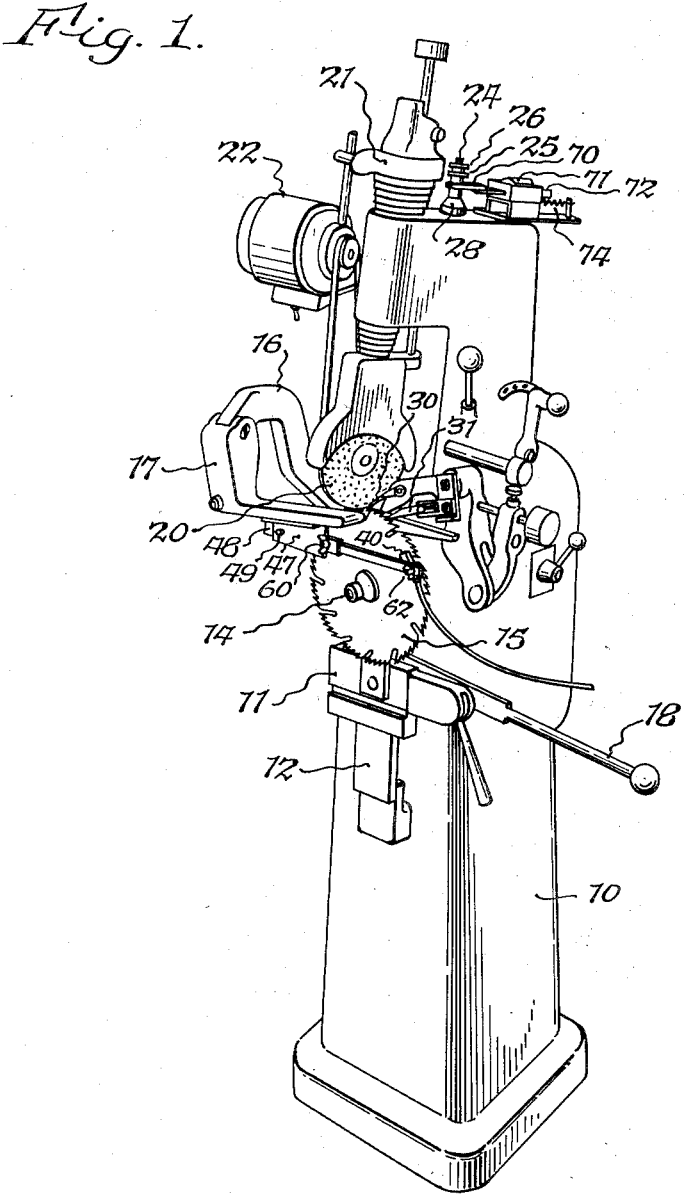
Fig. 1 is a perspective view of a saw sharpening apparatus having applied thereto an attachment embodying this invention for use in connection with the sharpening of saw blades having irregularly spaced teeth.

In Fig. 1 I have illustrated my invention applied to a standard saw-sharpening machine of the type commonly employed for sharpening saw blades, this machine including a frame or body member 10 extending upwardly from a base and having a saw blade supporting carriage 11 movable up and down on a guide 12 and having a pivot or arbor 14 secured thereto on which a saw 15 may be rotatably mounted. The machine also includes a saw clamp or vise having a fixed arm 16 secured to the frame of the machine, and a pivot arm 17, both of these arms having the usual parts for engaging opposite faces of a saw so as to frictionally oppose turning of the saw blade about the axis 14. The carriage 11 may be raised or lowered by means of a hand lever 18 for moving the carriage from a lowered position in which the blade may be readily mounted thereon, to an upper position in which the blade is in position to be sharpened.

20 represents the saw-sharpening member which may be in the form of a file or an abrasive wheel or disk mounted on a reciprocable head 21, the saw-sharpening wheel or disk being rotated by means of a motor 22 supported on the head 21. This head has a reciprocatory movement toward and from the saw and is also shiftable about its upright axis to alternately present the abrasive wheel or disk in different angular relations to alternate teeth. The head 21 has secured thereto a depth stop or control member which preferably has a threaded stem 24 provided with an adjusting nut 25 and a cooperating lock nut 26. This depth stop is shown more in detail in Figs. 5 and 6 and includes a fixed stop member 28 mounted on an upwardly extending portion of the frame 10 of the machine and relatively to which the threaded stem 24 may move up and down. When the nut 25 contacts with the stop 28, further downward movement of the head is prevented, and consequently by adjusting the nut into different positions on stem 24, the extent to which the sharpening member may move downwardly relatively to the saw blade may be controlled.

The machine also includes suitable means for turning the saw blade step by step about the pivot 14 to present teeth successively into position to be acted upon by the grinding wheel 20, such means as shown being a pair of dogs or latches 30 and 31 which advance the saw against the friction produced by the saw clamps or vise members 16 and 17.

All of the parts thus far specifically described have been commonly used in connection with saw-sharpening machines and of themselves do not constitute a part of this invention.

The particular saw blade 15 shown by way of example is provided with a plurality of groups of teeth, each group comprising four regularly formed teeth 35, a raker tooth 36 and a deep notch or slot 37 separating the raker tooth 36 from the next group of saw teeth 35. My improvements may, of course, be used in connection with other types of saw blades.

In accordance with my invention, I provide a member which is mounted to cooperate with a side or face of a saw blade in such a manner as to cooperate with any deep slot 37 in the blade. In the particular construction for this purpose, by way of example, I provide an electric switch which is mounted in a housing 40 and which includes a spring pressed member formed to move into and out of the slot 37. This member in the construction shown includes a roller 41 mounted on the end of a rod or plunger 42 guided on the switch housing 40 and which is yieldingly pressed outwardly by any suitable spring 43, shown in Fig. 5.

In operation the switch member is mounted so that the roller 41 will be arranged to ride on a side of the saw blade at a distance from the periphery thereof and will be pressed by a face of the saw blade against the action of the spring 43 into position to separate the two switch contacts to keep the circuit open. When the roller comes to a deep slot, the spring 43 in the switch housing moves the roller 41 into the slot, as shown in Fig. 3, thus closing a circuit. The mechanism in the interior of the switch housing may of course be of any other suitable construction to close a circuit when the roller 41 of the movable switch part enters a slot, that shown in Fig. 5 being merely diagrammatic. A pair of conductors forming a part of a cable are suitably connected with the stationary and movable switch members and constitute parts of a circuit to be hereinafter described.

In order to accommodate my attachment to operate on saw blades of different shapes and diameters, I have provided means for adjustably mounting the switch so that it can readily be positioned to enter into the deep slots or notches of a saw blade of any size or shape. In the construction shown for this purpose, I have provided on the clamping member 17 a supporting bracket 47, that shown being of angle shape, having one leg suitably secured to the clamping member 17 and the other leg extending downwardly therefrom. A slide member 48 is pivotally mounted on the downwardly extending leg of the angle shaped member 47, for example by means of a pivot pin 49, figs. 1 to 4. This slide member has a groove 50 in which a longitudinally adjustable supporting arm 51 for the switch member is arranged. This arm 51 is confined within the slide member 48 by means of cover plates 52 suitably secured to the slide member. The cover plates 52 are spaced apart to provide between them a space or slot through which a threaded clamping bolt 53 extends, one end of this bolt being secured to the arm 51, and a thumb nut 53 cooperating with a washer 55 serves to clamp the arm 51 in any desired position lengthwise of the slide member 48. Consequently the arm on which the switch box 40 is mounted may be adjusted lengthwise of the slide member 48 to the desired distance from the pivot 49, depending upon the diameter of the saw blade to be operated upon.

The switch supporting arm 51 may also be locked in any desired position about the pivot 49. In the construction shown for this purpose the downwardly extending leg of the angle shaped member 47 has an edge 58 which is concentric with the pivot 49 and the slide member 48 has a threaded bolt or stud 59 arranged slightly beyond the edge 58 of the angle shaped supporting member 47 and a thumb nut 60 with washer engages the flange 47 so that the slide member 48 and the arm 51 may be clamped into any desired angular position about the pivot 49.

The switch housing 40 also has an outwardly extending stud or bolt 62 secured to the switch member and extending through a hole in the end portion of the adjustable arm 51 so that the switch housing may be mounted in various angular relations to the supporting arm 51. By means of these various adjustments the switch housing 40 can be readily positioned into the desired relation to a saw blade to be sharpened. The switch housing may also be provided with a light 64 which is connected so as to be lighted when the circuit of the switch is closed.

In accordance with my invention I provide mechanism for limiting downward movement of the reciprocatory head to such an extent that the sharpening or abrasive wheel 20 will remain clear of the raker tooth 36 of the saw blade while the same is advanced by means of the dogs or latches 30 and 31 and for again permitting the head and the grinding member mounted thereon to move through its normal path when the teeth 35 are in positions to be sharpened by the wheel 20. In the construction shown for this purpose, I have made use of the depth stop mechanism, including the threaded stem 24 which moves up and down with the head, and the adjustable nuts arranged thereon. For this purpose I have provided a spacer or intercepter 70 which is normally out of operative relation to the depth control member, as shown in Fig. 6, but which may be moved into the position shown in Fig. 5, in which it is located above the fixed stop member 28 and between this member and the stop nut 25, so that when the head of the machine moves downwardly, the adjustable stop nut 25 will engage the interceptor 70 so that the downward movement of the head is stopped.

Figure 5:
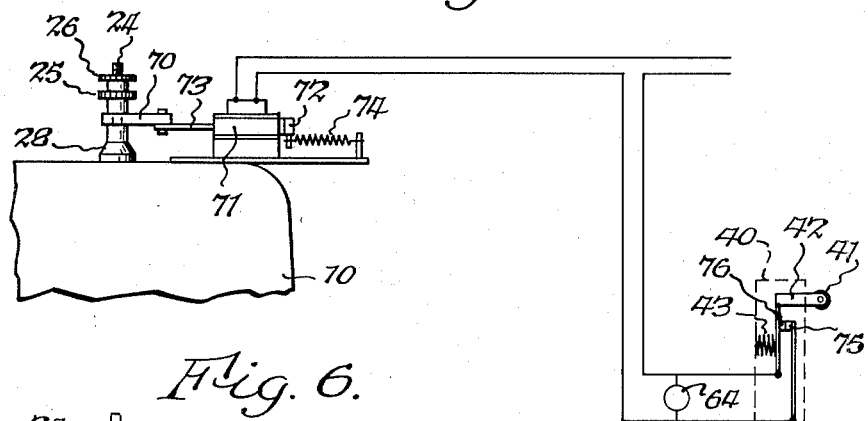
Fig. 5 is a fragmentary, side elevation of my attachment showing diagrammatically the electrical parts thereof.
Figure 6:
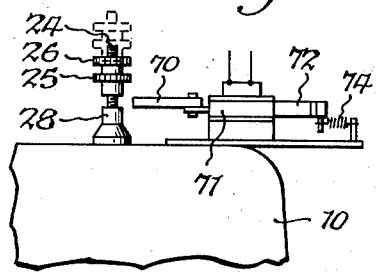
Fig. 6 is a fragmentary, side elevation thereof similar to Fig. 5, but showing the parts in different positions.
Figure 7:
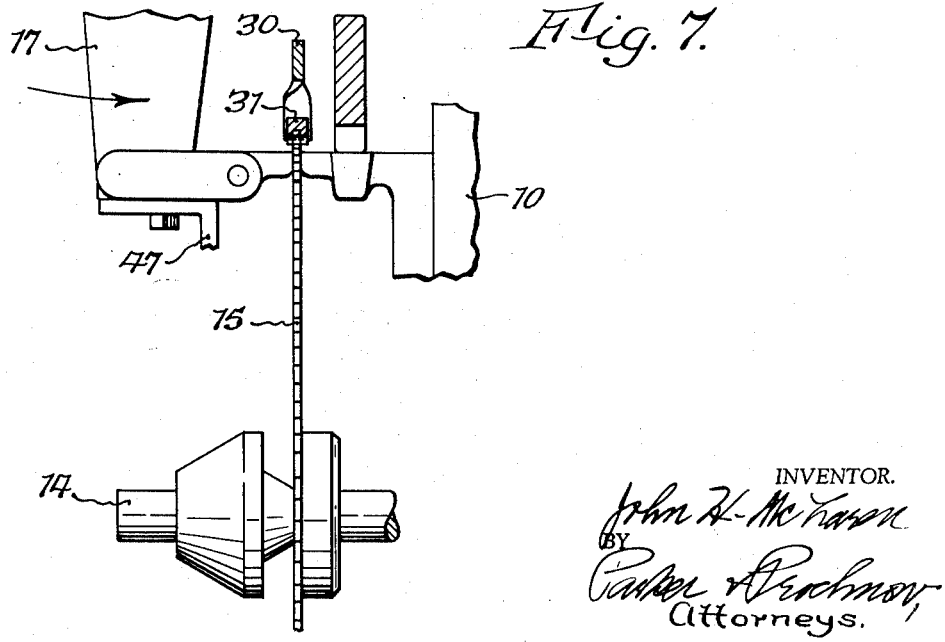
Fig. 7 is a fragmentary, sectional elevation thereof on line 7—7, Fig. 2.

The movement of the interceptor 70 into and out of position to stop descent of the head may be effected in any desired manner, and in the construction illustrated by way of example, a solenoid 71 is provided which has a core 72 suitably connected with the interceptor 70, for example, by means of a link 73, and a spring 74 normally pulls the core 72 rearwardly into the position shown in Fig. 6, in which the interceptor is out of engagement with the depth control means. However, when the solenoid is actuated by means of current passing through it because of the closing of the switch within the housing 40, the core of the solenoid will be drawn into the solenoid against the action of the spring into the position shown in Fig. 5, in which the interceptor 70 is arranged between the fixed stop member 28 and the adjustable stop nut 25. I have indicated the switch within the housing member 40 as including a fixed terminal 75, and a movable terminal 76, the position of which is controlled by means of the roller 41. Fig. 5 also shows diagrammatically conductors connecting the switch with the solenoid.

The manner of operation of the apparatus will be obvious from the foregoing description and the drawings. When a saw to be sharpened is positioned on the pivot 14 and the clamping member 17 has been moved into engagement with the saw blade, then the switch member within the housing 40 is adjusted by means of the mounting described so as to be in correct relation to the saw-sharpening member 20, so that this saw-sharpening member will move back and forth for operating on the teeth 35. This movement of the saw sharpening member and the head on which it is mounted is accomplished by the usual cams or other mechanism, not shown, in the same manner in which this movement was heretofore accomplished. When the roller 41 on the switch member enters a deep slot of the saw blade, the circuit through the switch member will be completed, thus energizing the solenoid 71 so that the interceptor 70 will stop the movement of the head carrying the saw-sharpening member to avoid damage to the raker tooth. After the raker tooth has passed the saw-sharpening wheel 20, the roller 41 will also move out of the slot 37, thus withdrawing the interceptor from the stop means and permitting the saw-sharpening member to reciprocate for the purpose of grinding the teeth 35 when they arrive in position to be acted upon by the saw-sharpening member or wheel 20. By mounting the switch housing 40 on the movable clamping member 17, this member will be moved into and out of its operative relation to the saw blade with the clamping member 17 when a different blade is to be mounted on the machine, and also when the sharpening has been completed.

While I have shown and described my improved mechanism for use in connection with a grinding wheel for sharpening saw teeth, it will be obvious that my attachment may be applied to a similar machine in which the sharpening of the teeth is effected by filing instead of grinding.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. Attachment for apparatus for sharpening saw blades to enable the apparatus to sharpen blades having groups of cutting teeth separated by slots, said apparatus including a reciprocatory head movable toward and from the saw blade and carrying a sharpening implement, said attachment including a circuit closing member having a part engaging a side of the saw blade, means for positioning said member in operative relation to the saw blade to enable said part to enter into said slots, and mechanism actuated by said circuit closing member when said part thereof enters a slot to restrict the movement of said head toward the saw.

2. Attachment according to claim 1 in which said apparatus has a depth stop which limits the movement of said head toward the saw blade, and in which said attachment includes a part movable into the path of movement of said depth stop to intercept movement thereof to prevent said sharpening implement from moving into sharpening relation to the saw blade.

3. Attachment for apparatus for sharpening saw blades to enable the apparatus to sharpen blades having groups of cutting teeth separated by slots, said apparatus including a reciprocatory head movable toward and from the saw blade and carrying a sharpening implement, said attachment including a switch having a terminal supporting part movable along a face of a saw to hold said switch in open circuit position and which moves said switch into closed circuit position when said part enters a slot, a solenoid having a plunger movable into the path of movement of said head to hold said head against movement into a position for sharpening a saw tooth, and means connecting said switch and said solenoid for actuating said solenoid to produce movement of said plunger into movement interrupting relation to said head when said switch part enters a slot of the saw blade.

4. An attachment for a saw sharpening machine provided with a support for a saw, means for advancing the saw step by step, and a saw sharpening implement mounted on a head movable to position said implement into and out of sharpening relation to the teeth of the saw, said attachment for enabling the machine to sharpen saws having groups of teeth spaced from each other by slots, including a contact member engaging a face of the saw adjacent to the teeth thereof in position to enter into a slot of the saw, a switch which is held in open circuit position by said contact member when the same engages a flat face of a saw and which is moved into closed circuit position when said contact member enters a slot, an electromagnetic device controlled by said switch and including a stop member movable into position to engage a portion connected with said head for interrupting movement of said head toward said saw when said electromagnetic device is actuated by current resulting from the closing of said switch.

5. An attachment according to claim 4 and including a depth stop which limits the movement of said head toward the saw, and means for guiding said stop member actuated by said solenoid into and out of position to interrupt movement of said depth stop toward said saw.

6. An attachment for a saw sharpening machine provided with a support for a saw, means for advancing the saw step by step, and a saw sharpening implement mounted on a head movable to position said implement into and out of sharpening relation to the teeth of the saw, and a clamping arm movable into a position to engage a face of the saw to yieldingly resist movement of the saw by said advancing means and swingable into a position out of engagement with the saw to permit the saw to be removed from the machine, said attachment for enabling the machine to sharpen saws having groups of teeth spaced from each other by slots, which includes a contact member adjustably mounted on said clamping arm and movable with said clamping arm into position to engage a face of the saw adjacent to the teeth thereon and in position to enter a slot of the saw, a switch which is held in open circuit position by said contact member when the same engages a flat face of a saw and which is movable into closed circuit position when said contact member enters a slot, and means controlled by said switch for stopping movement of said head toward said saw when said movable member is in a slot of said saw.

7. An attachment according to claim 6 in which the adjustable mounting of said contact member on said clamping arm includes a part pivotally mounted on said clamping arm, and a member on which said contact member is mounted and which is slidably mounted on said pivotally mounted part.

No references cited.